C. CORLISS.
TIME COMPUTING APPARATUS.
APPLICATION FILED MAY 10, 1915.

1,347,014. Patented July 20, 1920.

Witnesses:

Inventor
Cyrus Corliss

UNITED STATES PATENT OFFICE.

CYRUS CORLISS, OF BOSTON, MASSACHUSETTS.

TIME-COMPUTING APPARATUS.

1,347,014.  Specification of Letters Patent.  Patented July 20, 1920.

Application filed May 10, 1915. Serial No. 26,936.

*To all whom it may concern:*

Be it known that I, CYRUS CORLISS, a citizen of the United States, residing in Boston, in the county of Suffolk and State of Massachusetts, have invented an Improvement in Time-Computing Apparatus, of which the following description, in connection with the accompanying drawings, is a specification, like characters on the drawings representing like parts.

This invention relates to a computing apparatus which is especially designed and adapted for computing time.

The invention is particularly useful in computing the time of workmen or other employees, and has for its object to provide a simple, inexpensive and efficient apparatus for the purpose specified.

To this end, the apparatus is provided with a scale having numerals indicative of time, as for instance hours and minutes or other fractions of an hour or minutes alone.

It is further provided with a movable member corresponding with said scale and with which coöperates a pointer or device for moving said member with relation to the scale. The apparatus is also provided with a totalizer which is operatively connected with the movable member referred to in such manner that the movable member actuates the totalizer to indicate thereon the aggregate of a plurality of successive movements of the movable member, as will be described.

These and other features of this invention will be pointed out in the claim at the end of this specification.

Figure 1:
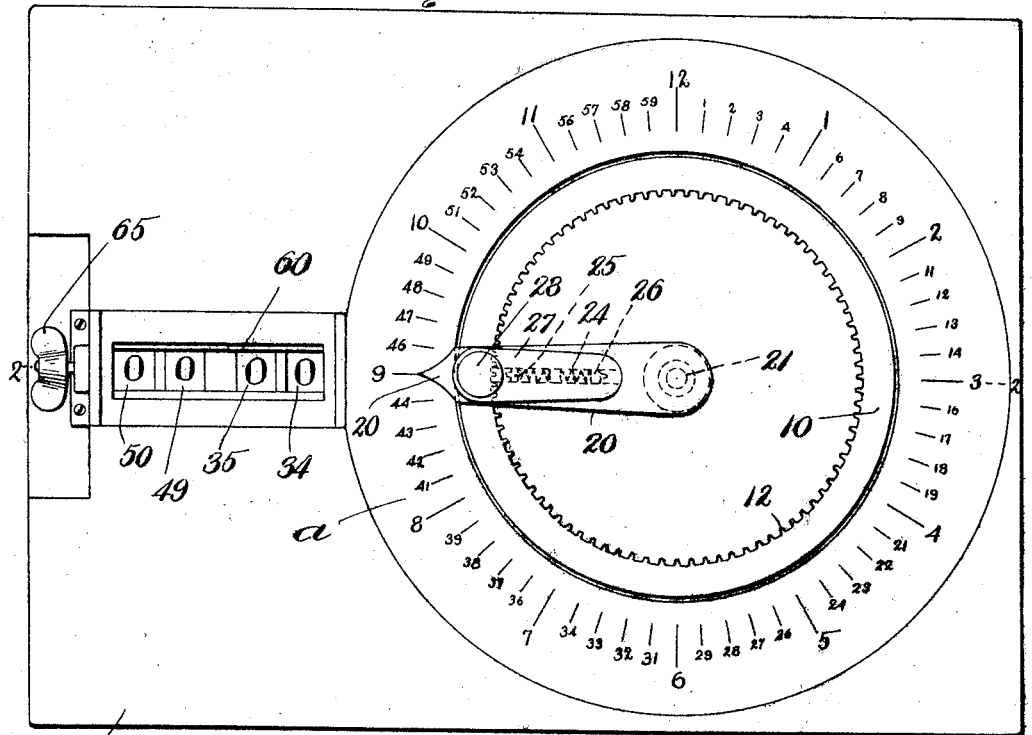
Figure 2:
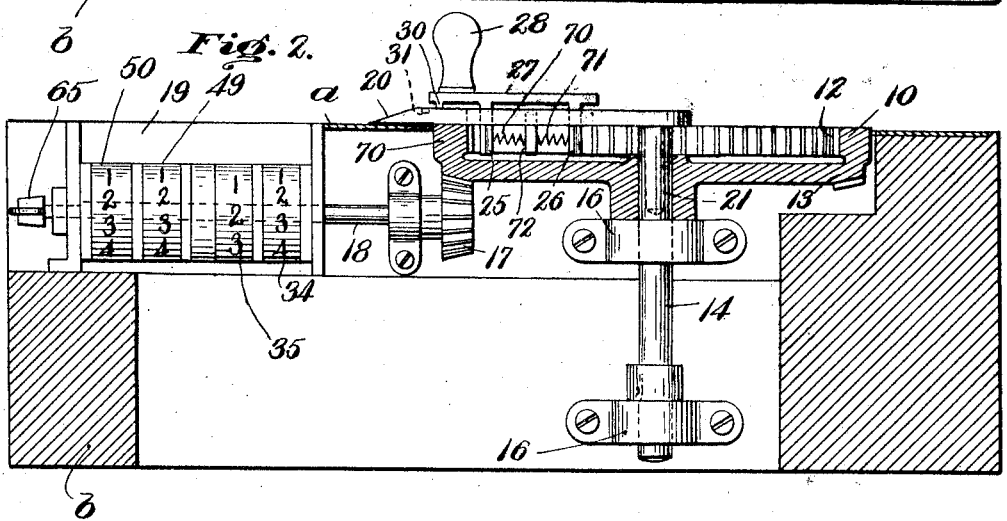

Figure 1 is a plan view of one construction of apparatus embodying this invention, Fig. 2, a vertical section on the line 2—2, Fig. 1, with parts in elevation.

In the present instance the invention is shown in an apparatus in which a scale $a$ is provided with graduations and with numerals indicative of hours and subdivisions of an hour. The scale $a$ is made as a circular ring of suitable material having the numerals 1 to 12 to indicate hours, and lines or subdivisions numbered from 1 to 60 to indicate minutes.

The scale $a$ may be secured in any suitable manner to the upper surface of a box or casing $b$, which supports the operative mechanism of the apparatus.

The scale $a$ has coöperating with it a movable member, preferably in the form of a ring 10 having internal teeth 12, which are equal in number to the number of subdivisions on the scale $a$, which in the present instance is 60.

The teeth 12 in the present instance are located on the inner circumference of the ring 10, which is attached to a gear 13 loosely mounted on a shaft 14, vertically supported within the box or casing $b$ by bearing members 16. The gear 13 is provided with 60 teeth and meshes with a pinion 17 on the shaft 18 of a totalizer 19, which is supported by the box or casing $b$.

The totalizer shaft 18 is rotated by the pinion 17 and gear 13 when the toothed ring 10 is turned on the shaft 14 as a center.

In the present instance, the toothed ring 10 is turned by means of a pointer 20, which is arranged to turn on the shaft 14 as a center and is shown as provided with a pin or arbor 21, which turns in a socket in the upper end of the shaft 14. In the present instance the pointer 20 is provided with means for coupling it to the toothed ring 10 and to this end the pointer is provided with a slot 24, through which are extended pins or devices 25, 26 on a sliding bar or member 27, which is carried by the pointer 20 and is provided with a handle 28.

By moving the slide bar 27 in one direction on the pointer, the pin 25 may be engaged with the toothed ring 10 so as to couple the pointer to said ring.

The slide bar 27 may be locked to the pointer 20, when the pin 25 is engaged with the toothed ring 10, by a projection 30 on the slide bar 27 entering a notch 31 in the pointer. When the slide bar 27 is locked to the pointer with the pin 25 engaged with the toothed ring 10, the pointer is coupled with the said ring, so that movement of the pointer in a circular path over the scale $a$ effects rotation of the toothed ring 10 and the gear 13 to the same extent, and the ratio of the gear 13 to the pinion 17 is such that the totalizer 19 is operated to move the disks 34, 35 so as to indicate a number or numbers on the disks 34, 35 corresponding to the number of graduations on the scale over which the pointer has been moved.

To illustrate, if the pointer 20 should be moved from the position shown in Fig. 1 to the numeral 12, it will pass over 15 graduations and the disks 34, 35 will be rotated so as to bring to view the numeral 1 on the disk 35 and the numeral 5 on the disk 34.

The apparatus is especially useful in railway systems, factories and like places for making up the total time an operator has been working at a given task spread over a number of periods.

The pointer 20 is capable of being turned clockwise or contra clockwise, when coupled with the minute ring 10, and when turned in a contra clockwise direction, the totalizer disks are turned in a reverse direction, and it will therefore be seen that any mistake on the part of the operator or clerk, caused by carrying the pointer beyond the proper graduation or number on the scale $a$ can be corrected by merely moving the pointer back in the opposite direction to the proper graduation, with the result that the disks of the totalizer are reversed to the proper numerals.

The disks of the totalizer may be set to zero by turning the shaft 18 by means of a thumb piece 65 in the same direction the shaft 18 is turned by the pointer.

From the above description, it will be understood that the relation between the driving gear and the driven gear 17 of the totalizer is such that the movement of the driving gear with relation to a given number of graduations on the scale $a$ will indicate on the totalizer the number equal to the number of graduations on the scale with relation to which the driving gear has been moved, or in other words, the number of graduations on the scale over which the pointer has been moved. I have herein shown one construction of apparatus embodying the invention but it is not desired to limit the invention to the particular construction shown.

Claim.

In an apparatus of the character described, in combination, a casing provided with a top having in it a plurality of openings one of which is circular, a circular member provided with teeth and rotatable in said circular opening, a scale on the top of said casing provided with graduations corresponding in number to the teeth of said rotatable member, a totalizer located in said casing below the other of said openings and visible therethrough and comprising a plurality of rotatable members, means for connecting said toothed circular member with said totalizer, a rotatable pointer pivoted within the opening with which said scale coöperates and movable freely over said scale in either direction for more than a complete revolution and independently of said toothed circular member, and means for coupling any desired tooth of said pointer with said toothed member.

In testimony whereof, I have signed my name to this specification in the presence of two subscribing witnesses.

CYRUS CORLISS.

Witnesses:
   Jas. H. Churchill,
   J. Murphy.